May 25, 1948.    J. S. P. ROBERTON    2,441,975
ELECTROMAGNETIC THROAT MICROPHONE
Filed Nov. 24, 1942    5 Sheets-Sheet 1

INVENTOR
J.S.P. Roberton.
BY
James N. Curtin
ATTORNEY

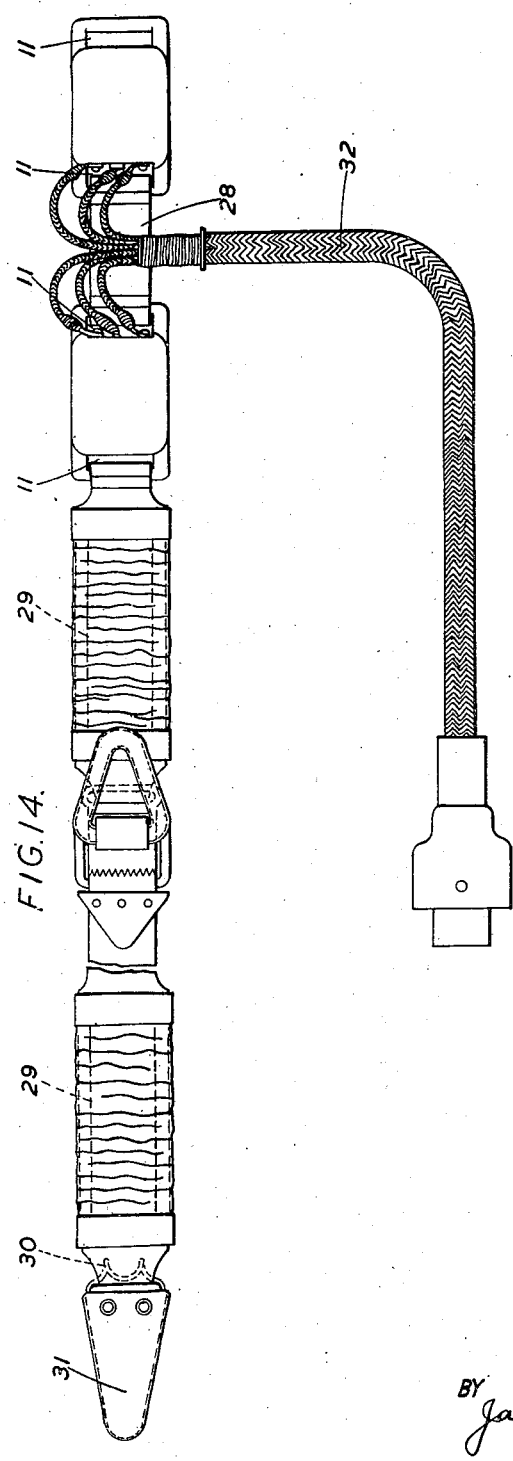

Patented May 25, 1948

2,441,975

UNITED STATES PATENT OFFICE 2,441,975

ELECTROMAGNETIC THROAT MICROPHONE

James Samuel Paterson Roberton, London W. C. 2, England, assignor to International Standard Electric Corporation, New York, N. Y.

Application November 24, 1942, Serial No. 466,736
In Great Britain November 28, 1941

6 Claims. (Cl. 179—114)

This invention relates to microphones and more particularly to that kind of microphone which is to be operated by contact e. g. with the throat of a user.

It is known that in such a microphone the output voltage should increase with the square of the frequency. It is also known to suspend the mass of a microphone from the moving element in contact with the throat by means of a comparatively stiff spring e. g. in an electromagnetic microphone to suspend the magnet system by means of a stiff spring from the plate in contact with the throat, the armature of the magnet being secured to this plate.

It is the object of the present invention to provide a contact microphone having better characteristics than those hitherto known.

According to the present invention we provide a microphone comprising a plate of light non-magnetic material, a magnetic armature fixed to said plate, a magnet system supported by stiff springs from said magnet armature and a cover totally inclosing the magnet system and loosely coupled to the remainder of the microphone.

The driven part of the microphone must be of small mass in order to give uniformity of characteristics under varying conditions of use. In order to avoid adding the mass of the cover to that of the driven system the cover is loosely coupled to the remainder of the microphone by mounting it with some degree of flexibility and providing means for damping its vibrations. Noise picked up by the cover from an external sound field is thus largely dissipated in the coupling and is not transmitted to the microphone. With this arrangement it is immaterial whether the cover be mounted on the base plate or on the magnet system.

An important subsidiary feature of the construction according to the present invention is that the magnet system is supported from the armature in such a manner as to have more than one mode of vibration which varies the average air gap between the magnet poles and the armature and thus to allow of the main resonance being placed lower in the frequency range than has been the case in known forms of contact microphone, as is described fully hereinafter. For this purpose the magnet system is supported from the armature by stiff springs at three points outside the plane of the air gap so that the suspended system may rock about axes parallel to the driven system to vary the average air gap and thus give rise to resonances which augment the upper frequencies in the range to be reproduced.

The nature of the invention will be better understood from the following description taken in conjunction with the accompanying drawings in which:

Fig. 14 shows one manner of supporting two laryngaphones on the throat of a user.

Figure 1:
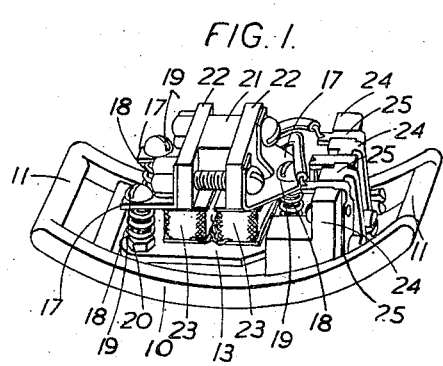
Fig. 1 is a perspective view of the assembled laryngaphone, with the cover removed.
Figure 3:
Figs. 3-5 are views of certain of the parts shown in Fig. 2 but from aspects other than those given in Fig. 2.
Figure 4:
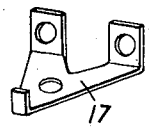
Figure 5:
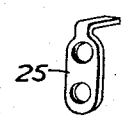
Figure 2:
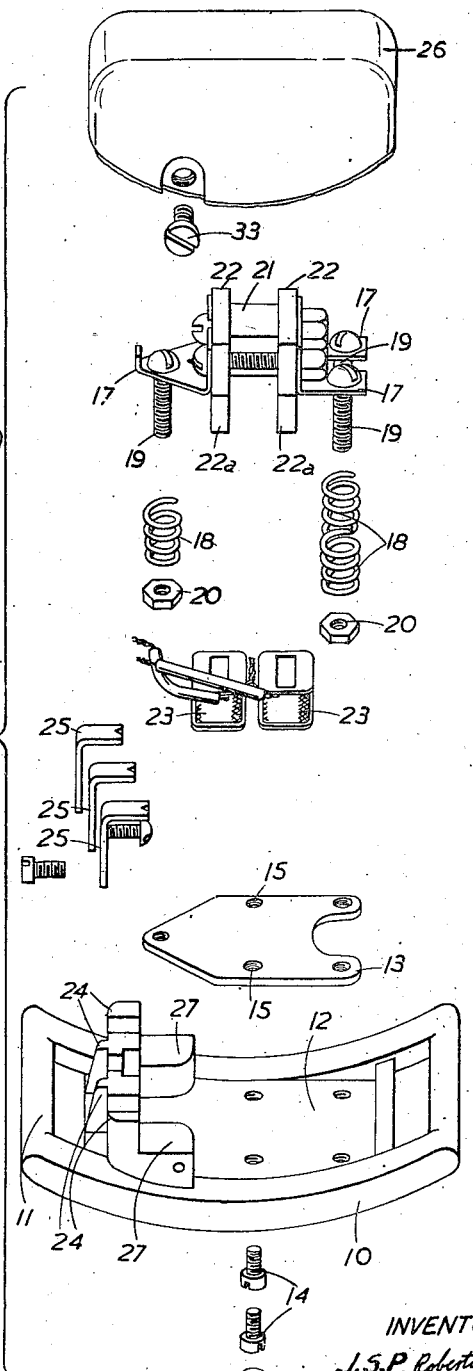
Fig. 2 shows the different parts to be assembled to form the structure of Fig. 1, together with the cover.

Referring to the drawings, and first to Figs. 1 to 5, a base plate 10 which is to contact with the throat is made as light as possible and consists of a curved plate of moulded material such as synthetic resin or thermoplastic material shaped on one face to make contact with the throat. It is formed with loops 11 by which it may be held by a tape against the throat, or incorporated in any suitable form of neck harness. On the face away from the throat, a rectangular depression 12 is provided in which is fixed a plate 13 of magnetic material; to ensure a firm joint which will transmit vibration without loss, the magnetic plate 13 is assembled with a suitable adhesive in addition to two fixing screws 14 which pass through holes in the base plate and into tapped holes 15 in the plate 13. To avoid discomfort to the wearer from projecting screws or from sharp edges, these fixing screws 14 are sunk into the moulded base plate and the hollows above their heads are filled in either with suitable filler such as wax, or with small discs 16 of synthetic resin or similar material cemented in. For the same reason the face in contact with the throat is well rounded. It is of importance that the adhesive should completely fill up any space between the magnetic plate 13 which acts as the armature of the magnetic system, and the base plate 10 in order that the vibrations of the base plate 10 shall be completely transmitted to the armature 13. On the magnetic plate 13 a magnet system is supported by a three point suspension consisting of three flat strips 17 of springy material acting as cantilever springs and three coiled springs 18. Fixing screws 19 pass through the coiled springs 18 into the plate; the coiled springs are under compression and together with the flat springs have sufficient stiffness to prevent the magnet system from pulling in to the flat plate under the steady force of magnetic attraction.

The magnet system consists of a block shaped permanent magnet 21 of magneto thermally treated material clamped between two T-shaped pole pieces 22. The stem 22a of each pole-piece carries a coil 23 and extends towards the aforementioned plate 13 of magnetic material which forms the armature. The use of the above mentioned material for the permanent magnet enables the magnet system to be of small mass.

The three fixing screws 19 and coiled springs 18 provide a ready means of adjusting the airgaps between the pole tips and the armature so that they are equal and uniform; three lock-nuts 20 between the coiled springs and the base plate are then tightened to retain the adjustment.

At one end of the base plate upraised portions 24 provide mountings for three terminals 25; the outside terminals are connected to the windings, while the centre terminal is soldered directly to a tag on one of the suspension springs, so providing a frame connection for earthing purposes. A light cover 26 of moulded synthetic resin material, for example, is fixed by two self-tapping screws 33 to the upraised portion 27 of the base plate. The cover is lined with soft material, such as felt or chamois leather which closes the gap between the cover and the base plate and slightly damps the vibration of the latter. It may, if desired, carry a magnetic screen or be made entirely of magnetic material for screening purposes. Since the screws 33 extend parallel to armature 13, the cover is flexibly mounted and its movement with respect to the magnet system is damped by the lining. The cover may, however, be mounted in a similar manner on the magnet system, its movement with respect to the armature being in that case similarly damped by the lining.

Figure 6:
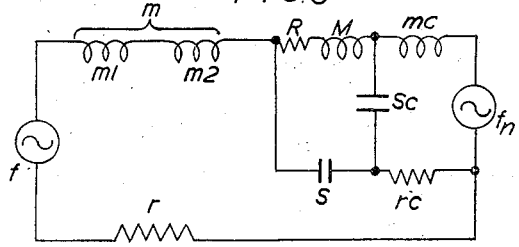
Figs. 6 and 8 show electrical analogues of two different structures, the mechanical systems of which are shown diagrammatically in Figs. 7 and 9 respectively.
Figure 7:
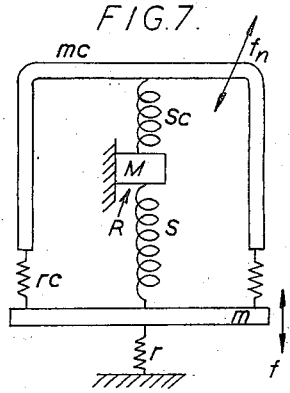

The complete electrical analogues of the mechanical system of the contact microphone are shown in Figs. 6 and 7 respectively, for the constructions in which the cover is mounted on the magnet system and on the base plate. A simplified form of electrical analogue is given in Fig. 10. The corresponding mechanical systems shown also in schematic form are given in Figs. 7, 9 and 11. The various elements shown in the schematics are defined below.

Figure 8:
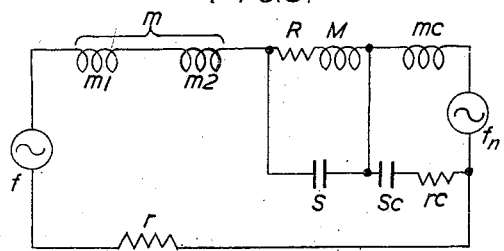

$f_1$ = vibromotive force due to vibration of the larynx.
$f_n$ = vibromotive force due to external noise field.
$m_1$ = effective mass of the larynx and part of the neck which transmits vibration to the microphone.
$m_2$ = the driven mass of the microphone (i. e. of the base plate and parts fixed thereto).
$m = m_1 + m_2$.
$M$ = suspended mass i. e. the mass of the magnet system.
$m_c$ = mass of the cover.
$S$ = stiffness of the suspension springs.
$S_c$ = stiffness of the cover supporting spring in Figs. 6 and 7; or of the cover fixing screws in Figs. 8 and 9.
$r$ = mechanical resistance due to the neck, plus air damping on the driven system etc.
$R$ = mechanical resistance acting on the suspended system.
$r_c$ = mechanical resistance due to the damping material between the cover and the base plate.
$G$ = force factor = volts generated per unit relative velocity of the driven and suspended systems.
$E$ = E. M. F. generated in the windings of the microphone.
$n$ = number of turns on the windings.
$\omega = 2\pi \times$ frequency.
$v_1, v_2$ = velocities of the driven and suspended systems respectively.
$j = \sqrt{-1}$.

Figure 9:
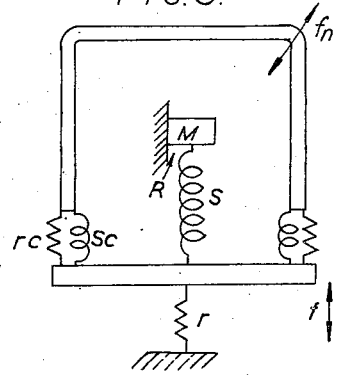

Referring to Figs. 7 and 9 it will be seen that a force $f_n$ due to the external noise field is shown acting on the cover. It has been found that when the microphone is used in a noisy situation, a noise voltage is generated in the microphone due to relative motion of the masses M and m under the impress of the sound field; most of the noise is picked up by the cover and communicated to the rest of the system.

It will also be seen from Figs. 6, 7, 8 and 9, that if $r_c$ be made infinitely large, which is equivalent to bringing the cover into rigid mechanical contact with the base plate, that the cover mass $m_c$ then acts wholly in series with the masses $m_1$ and $m_2$. If however $r_c$ is made very small, and also $S_c$ is proportioned so that its reactance at the lowest frequency (and, therefore, at all other frequencies also) of the voice range under consideration, say, 200 cycles/second is small compared with the reactance of $m_c$, then the noise picked up by the cover is not communicated to the body of the microphone and the mass of the cover is virtually isolated from the rest of the system. Since the resistances $r$ and $R$ are small compared with the reactances of the corresponding masses $m$ and $M$, they may be neglected in deriving the formula for the E. M. F. generated. The schematics Figs. 6 and 8 then reduce to the simplified form shown in Fig. 10 while the mechanical system may be correspondingly shown in simplified form as in Fig. 11.

Figure 10:
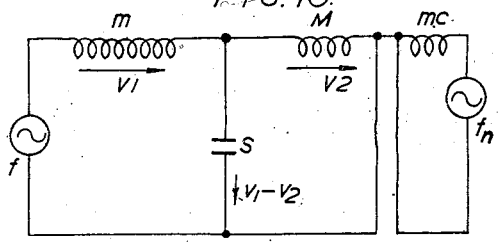
Figs. 10 and 11 are respectively a simplified electrical analogue and mechanical system.
Figure 11:
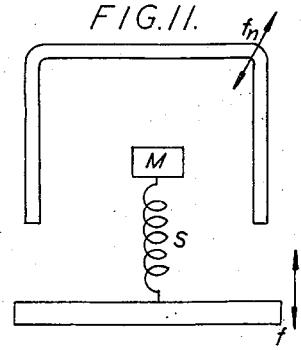

Referring now to Fig. 10, the E. M. F. developed per turn of the windings is equal to the force factor divided by the turns, and multiplied by the relative velocity of the driven system and suspended system, i. e.

$$\frac{E}{n} = \frac{G}{n}(v_1 - v_2)$$

Solving the network of Fig. 10, it can easily be shown that $$(v_1 - v_2) = \frac{f_1}{j\omega m\left(\frac{\omega_0^2}{\omega^2} - 1\right)}$$

hence $$\frac{E}{n} = \frac{G}{n} \cdot \frac{f_1}{j\omega m\left(\frac{\omega_0^2}{\omega^2} - 1\right)} \quad (1)$$

where $$\omega_0^2 = S\left(\frac{1}{M} + \frac{1}{m}\right) \quad (2)$$

If no microphone were present, the throat velocity would be $$\frac{f_1}{j\omega m_1}$$

Equation 1 can then be re-written in the following form:

$$\frac{E}{n} = \frac{f_1}{j\omega m_1} \cdot \frac{G}{n} \cdot \frac{m_1}{m} \cdot \frac{1}{\left(\frac{\omega_0^2}{\omega^2} - 1\right)} \quad (3)$$

from which it is evident that the microphone frequency characteristic has the frequency characteristic of the throat velocity multiplied by a constant $$\frac{G}{n} \cdot \frac{m_1}{m}$$

and by a factor $$\frac{1}{\left(\frac{\omega_0^2}{\omega^2}-1\right)}$$

which is variable with frequency. It is known that the ratio of the throat velocity $$\frac{f_1}{j\omega m_1}$$

to the particle velocity of air vibrations in the sound field close to the mouth of a speaker, varies inversely as the square of the frequency approximately. In order to make the output of a throat microphone correspond with the frequency characteristic of speech, therefore, the microphone itself should have a compensating characteristic, i. e. efficiency should be directly proportional to the square of frequency, as is known. To this end it is known to fix the resonance frequency corresponding to $\omega_0$ at a value near the top of the frequency range to be reproduced. Then in the region where $\omega$ is much less than $\omega_0$, the factor $$\frac{1}{\frac{\omega_0^2}{\omega^2}-1}$$

approximates to $$\frac{\omega^2}{\omega_0^2}$$

which shows that the microphone characteristic has the desired quadratic character. In the region where $\omega$ is only slightly less than $\omega_0$ the characteristic tends to rise too steeply to follow the desired quadratic law. The addition of suitable damping, however, can be used to correct this and to maintain a substantially constant slope of 12 db. per octave which corresponds to the desired quadratic law. At frequencies above $\omega_0$, of course, the output of the microphone tends to fall off rapidly.

Unfortunately, the higher the value of $\omega_0$, the lower is the sensitivity of the microphone; this is shown by the factor $$\frac{1}{\left(\frac{\omega_0^2}{\omega^2}-1\right)}$$

Figure 12:
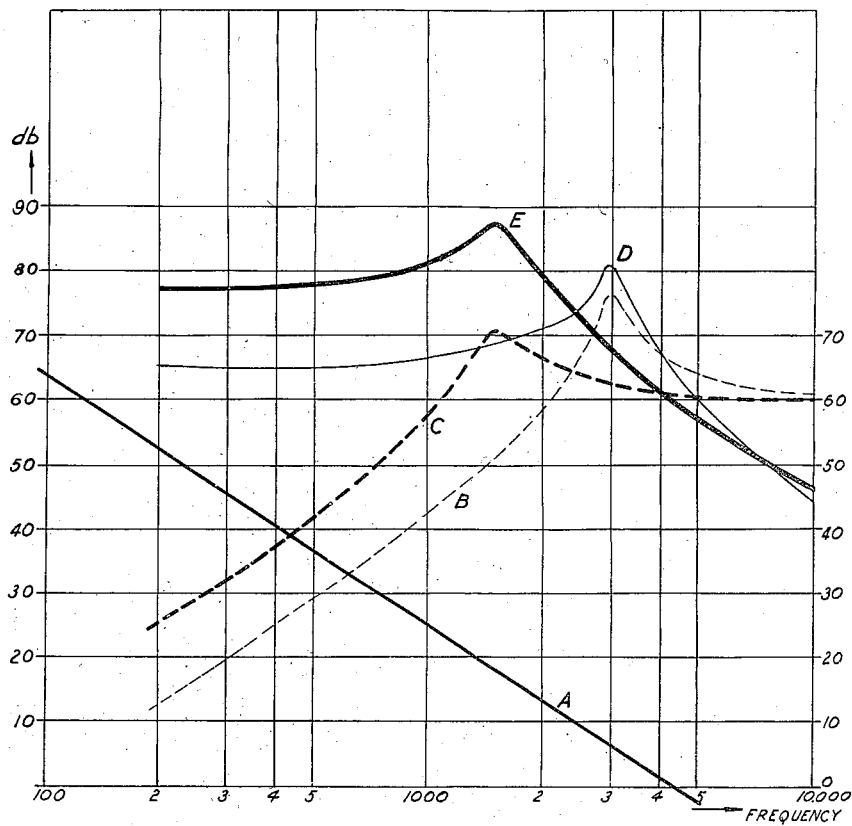
Figs. 12 and 13 are curves illustrating the response of laryngaphones to speech frequencies.
Figure 13:
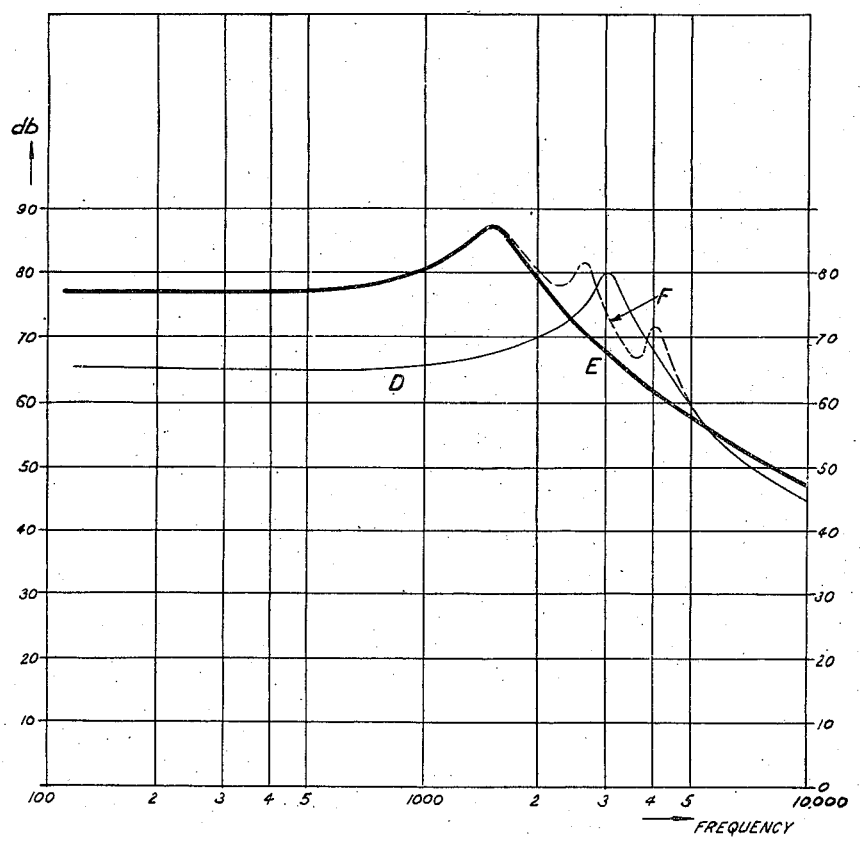

We therefore find that a better overall result is obtained by arranging $\omega_0$ near the middle of the frequency range to be reproduced, and using other means to flatten the combined frequency characteristic of microphone and throat at frequencies higher than $\omega_0$. This is achieved by permitting the suspended system more than one mode of vibration and arranging that the various modes of vibration come into resonance at suitable points within the frequency range. Equation 3 is derived on the assumption of only one mode of vibration of the suspended system in which the latter moves perpendicularly to the driven system. In fact there are other modes of vibration which occur, for example, rocking or rotational motions of the suspended system about axes parallel to the driven system. These other modes of vibration cause a net change of airgap length because the plane of the suspension springs is above the plane of the armature. Figures 12 and 13 show how the desired result is attained. Fig. 12, curve A represents, on a decibel scale, the variation with frequency of the throat velocity $$\frac{f_1}{j\omega m_1}$$

Curve B shows the microphone characteristic for a value of $\omega_0$ corresponding to 3000 p. s., while curve D shows the characteristic of the combination of throat and microphone obtained by adding the ordinates of curves A and B. Similarly curve C shows the microphone characteristic for a value of $\omega_0$ corresponding to 1500 p. s., while curve E shows the combined characteristic obtained by adding ordinates of curves A and C. These curves all refer to systems having a single resonance.

In Fig. 13 curves D and E of Fig. 12 are repeated, and in addition curve F shows the output for a microphone having 3 modes of vibration. It will be seen that the mean sensitivity of the microphone represented by curve F is about 12 db. greater than the sensitivity of the microphone represented by curve D, and that the mean output above a frequency of 2000 p. s. is approximately equal in the two cases. The three peaks of curve F correspond to resonance in the three modes of vibration. The resonances are spaced throughout the upper part of the range of frequencies to be reproduced, so as to give as flat a curve as possible. Independent control of the resonant frequencies is possible because they depend on constants, the relationships of which with the dimensions of the microphone parts, are different for the various modes. The two upper resonances shown in curve F are due to rocking of the magnet system about two axes at right angles, both parallel to the armature 13. The moments of inertia and stiffnesses of the magnet system are both different for these two modes of vibration.

Certain other desiderata become clear from the equations derived for the E. M. F. per turn. From (1) it is evident that in addition to the effect of $\omega_0$ on the efficiency, other conditions for maximum output are as follows:

(a) $m$ should be a minimum. Since $m = m_1 + m_2$ of which $m_1$ is given, then $m_2$ should be a minimum.

(b) $G/n$ should be a maximum. $G/n$ is a parameter defining the efficiency of the magnetic circuit, which by correct choice of materials, dimensions of pole pieces and airgap, and polarising flux density, may be made a maximum for, say, a given weight of the suspended system consisting of the magnet, pole pieces and windings. The value of $G/n$ could be increased by increasing the size of the system generally, but this has the disadvantage of increasing the overall weight.

From the Formula 2 may be deduced the conditions for least variation of $\omega_0$ with variation of $m$. The driven mass $m$ will vary, of course, because of differences in $m_1$ from one wearer to another, also the amount of $m_1$ effective in any given case will depend on such factors as location of the microphone on the neck, and the pressure employed. It will be clear from Formula 2 that if M is small compared with $m$, then variations of $m$ will have a negligible effect on $\omega_0$. As M is made smaller, however, $s$ must also be decreased, to preserve the relationship of (2) in which $\omega_0$ is given. S must be sufficient to avoid pulling in of the suspended system towards the armature against the restoring force of the suspension springs; hence, there is a minimum value of $m$ determined by this requirement.

We find that $m_1$ is surprisingly low, being between 3 and 4 grams. If $m_2$ has a value about three times $m_1$, i. e. 10.5 grams, and M has a value about twice $m_1$, i. e. 7 grams, then a reasonable compromise is reached between the above-mentioned desiderata, some of which are conflicting. Moreover, the total weight of a unit, including the weight of the cover, is then about 20 grams, so that the unit is light and easy to wear.

Conveniently, two laryngaphones are mounted as shown in Fig. 14 so that they fit on the two sides of the larynx. The adjacent loops 11 of the two units are joined by a piece of flexible but comparatively inextensible material 28 which thus defines the relative positions of the two units. A flexible extensible strap 29 clips in the other loops and extends around the neck of the user. Preferably the strap is in two portions and one end is fixed to a wire clip 30, which can be clipped in one of the loops 11. The clip 30 is integral with a tongue 31 which can be moved by the hand of the user to disengage the clip 30 from its loop 11 in case of emergency.

The two laryngaphones are connected in series aiding and through a cord 32 to a transmitting equipment.

What is claimed is:

1. A microphone, including an exterior casing, a tympanum for picking up operating vibrations, said tympanum being adapted to be placed in contact with the source of said vibrations and forming a portion of said casing, a magnetic armature rigidly fastened to said tympanum, electro-acoustic transducing means comprising a magnetic system positioned within said casing and actuated by said armature, a spring coupling between said armature and said magnetic system permitting rocking movements of the armature with respect to the magnetic system, and means for reducing the pick-up of undesired vibrations by said casing.

2. A microphone comprising electro-acoustical transducing means, an open casing to receive and to act as a cover for the transducing means, a base plate to close the casing, a relatively elastic mechanical coupling between base plate and transducing means to transduce acoustical vibrations acting upon the base plate, a flexible but non-elastic lining filling substantially the space between said casing and the edges of said base plate, thereby providing substantially acoustic insulation between said cover and transducing means.

3. In a microphone, electro-acoustic transducing means, an open casing to receive and to act as a cover for said transducing means, a base plate to close the casing, a relatively elastic mechanical coupling between said base plate and said transducing means to transduce acoustic vibrations acting upon the base plate, and means associated with the casing to reduce the transduction of acoustical vibrations acting upon the casing, said transducing means comprising a magnetic system, an armature associated therewith and rigidly attached to the base plate and a spring coupling between said armature and said magnetic system permitting rocking movements of said armature about at least two axes at right angles, both axes being arranged parallel to the said armature, with respect to the magnetic system, said armature thereby having a main resonance in the middle of the operating frequency range and at least one subsidiary resonance in the upper part of the range.

4. A microphone comprising electro-acoustical transducing means, an open casing to receive and to act as a cover for the transducing means, a base plate to close the casing, an acoustical mechanical coupling between base plate and transducing means to transduce acoustical vibrations acting upon the base plate, and means associated with the casing to reduce the transduction of acoustical vibrations acting upon the casing, said transducing means comprising a magnetic system, an armature associated therewith and rigidly attached to the base plate, and a spring coupling between armature and magnetic system permitting rocking movements of the armature with respect to the magnetic system, said spring coupling including a three-point spring support consisting of three cantilever leaf springs attached to the magnetic system and three compressed coil springs coupling the armature to the leaf springs.

5. A microphone including an exterior casing, a tympanum for picking up operating vibrations, said tympanum being adapted to be placed in contact with the source of said vibrations and forming a portion of said casing, a magnetic armature rigidly fastened to said tympanum, electro-acoustic transducing means comprising a magnetic system positioned within said casing and actuated by said armature, a spring coupling between said armature and said magnetic system permitting rocking movements of the armature with respect to the magnetic system, said spring coupling including a three-point spring support consisting of three cantilever leaf springs attached to the magnetic system and three compressed coil springs coupling the armature to the leaf springs.

6. A microphone according to claim 5 wherein an adjusting screw is associated with each cantilever leaf spring and coil spring and is adjustable to vary the air gap between the magnetic system and said armature.

JAMES SAMUEL PATERSON ROBERTON.

REFERENCES CITED

The following references are of record in the file of this patent:

UNITED STATES PATENTS

| Number | Name | Date |
|---|---|---|
| 1,730,761 | French | Oct. 8, 1929 |
| 2,121,779 | Ballentine | June 28, 1938 |
| 2,121,781 | Ballentine | June 28, 1938 |
| 2,144,458 | Koch | Jan. 17, 1939 |
| 2,202,906 | Hawley | June 4, 1940 |
| 2,252,846 | Giannini et al. | Aug. 19, 1941 |
| 2,255,249 | Greibach | Sept. 9, 1941 |
| 2,255,250 | Greibach | Sept. 9, 1941 |

FOREIGN PATENTS

| Number | Country | Date |
|---|---|---|
| 337,094 | Great Britain | Oct. 30, 1930 |
| 451,233 | Germany | Oct. 22, 1927 |